March 24, 1959

H. H. HOGE ET AL 2,879,412

ZENER DIODE CROSS COUPLED BISTABLE TRIGGERED CIRCUIT

Filed April 26, 1956

WITNESSES:

Bernard R. Gieguey

Leon M. Garman

INVENTOR
Henri H. Hoge and
Douglas L. Spotten.

BY John B. Davidson
ATTORNEY

United States Patent Office 2,879,412

Patented Mar. 24, 1959

2,879,412

ZENER DIODE CROSS COUPLED BISTABLE TRIGGERED CIRCUIT

Henri H. Hoge and Douglas L. Spotten, Baltimore, Md., assignors to Westinghouse Electric Corporation, East Pittsburgh, Pa., a corporation of Pennsylvania Application April 26, 1956, Serial No. 580,807

6 Claims. (Cl. 307—88.5)

This invention relates to triggered circuits having two conduction states and more particularly to such circuits wherein use is made of semiconductive devices. There are many applications of triggered circuits that require multitudes of identical units functioning as a group. An example of such use would be in digital computers or supervisory control systems where thousands of units must often be compressed into a very small enclosure. Obviously, economy of component parts is of utmost importance in such applications in order to minimize cost and size. Furthermore, in order to simplify auxiliary circuitry, it is important to keep the number of power supplies required to supply bias voltage to the devices to a very minimum. In the past, Eccles-Jordan type circuits have been extensively utilized, but such circuits require at least two power supplies.

One object of this invention is to provide triggered circuits having a minimum number of component parts.

Still another object is to provide a bistable trigger circuit utilizing component parts of small size so that the assembly will occupy a minimum volume.

A still further object is to provide a bistable trigger circuit requiring a single source of supply voltage of only one polarity.

A further object is to provide a triggered circuit having two conduction states having very short rise and fall times so as to provide square waves of high fidelity.

Other objects and features of the invention will become apparent upon consideration of the following description thereof when taken in connection with the accompanying drawing, wherein.

Figure 1:
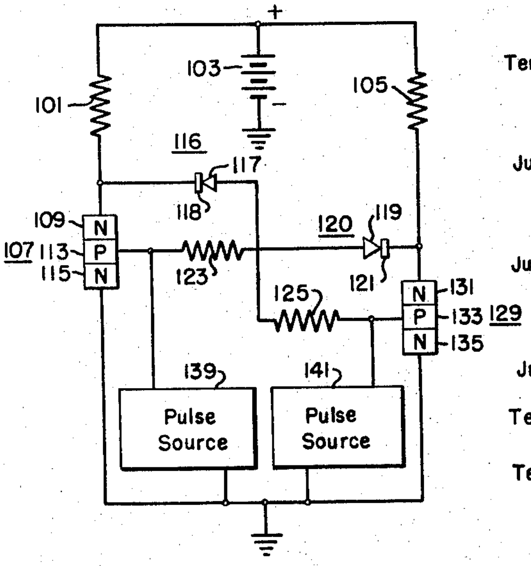
Figure 1 is a schematic diagram of a simple type of bistable triggered circuit made possible by this invention.

According to one aspect of this invention, a pair of electric valves each having a control electrode for controlling current flow between two other electrodes thereof are coupled to a bias voltage source through respective impedance means and the voltage between the two electrodes of each valve is coupled to the control electrode of the other valve, preferably by means of a coupling device that will conduct electrical current only when a voltage of at least a predetermined magnitude is imposed thereacross. The two coupling devices are chosen so as to have different breakdown voltages. Upon application of the bias voltage source to the circuit, the coupling device with the lower breakdown voltage will trigger one valve to full current conduction, lowering the voltage drop thereacross so that the coupling device with the higher conduction state cannot be triggered to conduction. Application of a pulse to the control electrode of the conducting device of a polarity so as to cut off conduction therethrough will cause the voltage thereacross to rise so as to break down the other coupling device and drive the other valve to full current conduction. The initial conduction state will again prevail by application of a pulse to the control electrode of the second valve so as to cut off conduction therethrough. With reference now to Fig. 1, there is shown a pair of electric valves 107 and 129 which preferably are junction transistors, here shown as N–P–N type junction transistors. The collector 109 of transistor 107 is connected to the positive terminal of a source of bias voltage 103 through resistor 101; similarly, collector electrode 131 of transistor 129 is connected to the positive terminal of source 103 through resistor 105. Base electrode 113 of transistor 107 is connected to collector electrode 131 by means of serially connected resistor 123 and Zener diode 120; similarly, base 133 of transistor 129 is connected to collector 109 by means of serially connected Zener diode 116 and resistor 125. The Zener diodes 116 and 120 are chosen so as to have substantially different Zener breakdown voltages. While either diode may have the lower breakdown voltage, it will be assumed that the breakdown voltage of diode 120 is lower than that of diode 116. The anode 119 and cathode 121 of diode 120 are respectively connected to resistor 123 and collector 131. The anode 117 and cathode 118 of Zener diode 116 are respectively connected to resistor 125 and collector 109. The Zener diodes are chosen so as to have different breakdown voltages of magnitudes lesser than the output voltage of bias source 103. Emitters 115 and 135 of transistors 107 and 129 respectively are connected directly to the negative terminal of source 103.

A pair of pulse sources 139 and 141 are provided for the purpose of selectively biasing the transistors to collector current cutoff. The negative output terminals of the pulse sources 139 and 141 are respectively connected to base electrodes 113 and 133 while the other output terminal is connected together and to the negative terminal of bias source 103. The output pulses of the two pulse sources must be of sufficient duration to cut off collector current through the respective transistor connected thereto until the emitter-collector voltage across the other transistor has risen to a value sufficient to break down the Zener diode connected to the collector electrode thereof.

In operation let it be assumed that bias source 103 has just been connected to the circuit, or has just been energized so as to provide bias voltage to the circuit. The voltage between the emitter and collector electrodes of the two transistors will rise until diode 120 will break down before diode 116, applying a pulse of base current to transistor 107 so as to quickly drive transistor 107 to full current conduction. Collector 109 will now be only a few volts above emitter 115 so that it will be impossible for Zener diode 116 to break down. Assume now that an output pulse from source 139 is applied to base 113 to cut off collector current conduction through transistor 107. The voltage between emitter 115 and collector 109 will quickly rise until diode 116 breaks down. Transistor 129 will thereupon be driven to full current conduction, and collector 131 will be at a very low potential with respect to emitter 135. The voltage across diode 120 will drop below the Zener breakdown voltage of the diode so that substantially zero base current will flow through transistor 107 and the transistor will be cut off. By applying a pulse to base 133 from pulse source 141, current conduction through transistor 129 will be cut off, Zener diode 120 will again break down to drive transistor 107 to full current conduction, and current flow through diode 116 will cease so that transistor 129 is again at collector current cutoff. Thus, it will be seen that the circuit described above has two stable states, depending upon which of Zener diodes 116 and 120 is passing Zener current.

The following values have been found to be entirely satisfactory for operation of the circuit described above.

The values set forth below, however, are exemplary only and are not to be taken in a limiting sense.

| | |
|---|---|
| Resistors 101 and 105 | 10,000 ohms. |
| Resistors 123 and 125 | 150,000 ohms. |
| Transistors 107 and 129 | Texas Instrument type 904. |
| Diode 116 | 1N200. |
| Diode 120 | 1N202. |
| Bias source 103 | 25 volts. |

Figure 2:
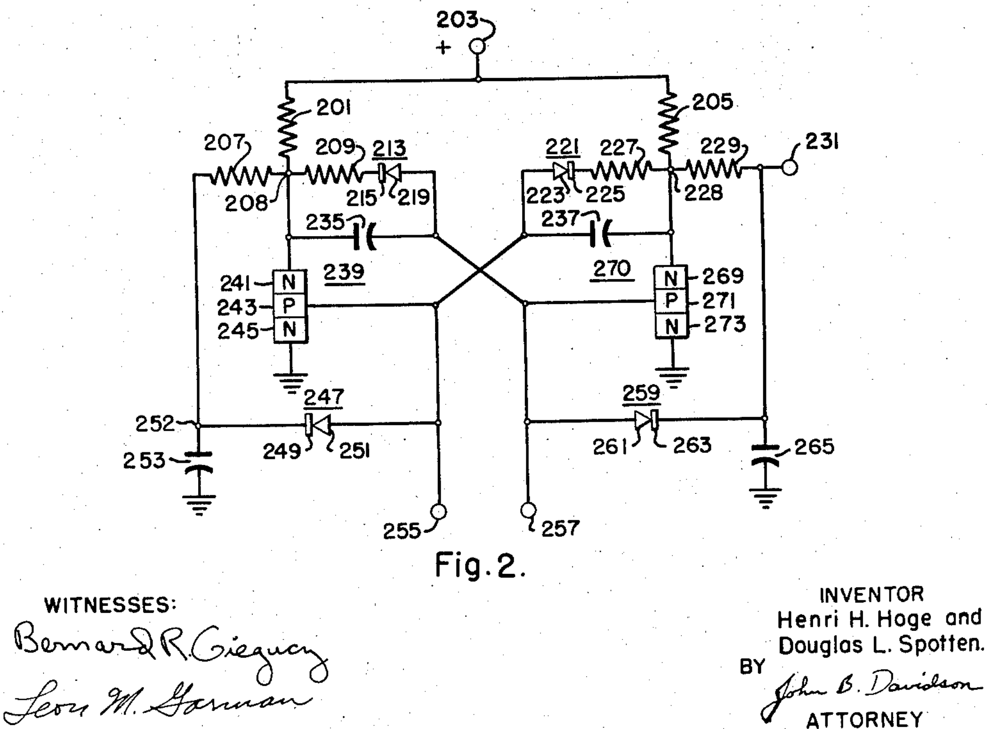
Fig. 2 is a schematic diagram of a modification of the invention illustrating a square wave generator.

In Fig. 2 there is shown a square wave relaxation type oscillator embodying certain of the principles of operation of the embodiment of Fig. 1. In this embodiment a pair N-P-N type junction transistors 239 and 270 are connected to the positive terminal 203 of a bias source (not shown) through resistors 201 and 205, respectively. The collectors 241 and 269 of transistors 239 and 270 respectively are connected to the resistors 201 and 205 while the emitters 245 and 273 thereof are connected to the negative terminal of the bias source, here shown as ground. Base electrode 243 of transistor 239 is connected to collector electrode 269 by means of serially connected Zener diode 221 and resistor 227 and capacitor 237 in parallel with the diode 221 and resistor 227. Anode 223 is connected to base electrode 243 and cathode 225 is connected to resistor 227. Similarly, collector 241 is connected to base electrode 271 of transistor 270 by means of serially connected resistor 209 and Zener diode 213 and capacitor 235 in parallel with resistor 209 and diode 213. Cathode 215 is connected to resistor 209 and anode 219 is connected to base electrode 271. An integrating or timing circuit including serially connected resistor 229 and capacitor 265 is connected between the collector and emitter electrodes of transistor 270. The junction of resistor 229 and capacitor 265 is connected to base electrode 271 by a Zener diode 259, the anode 261 of the diode being connected to base electrode 271 and the cathode 263 to the juncture of the resistor and capacitor. When the diode is passing Zener current, capacitor 265 is effectively connected between the emitter electrode 273 and base electrode 271 of transistor 270. A second integrating or timing circuit comprising serially connected resistor 207 and capacitor 253 is connected between the collector and emitter electrodes 241 and 245 of transistor 239. Anode 251 of Zener diode 247 is connected to base electrode 243 and anode 249 is connected to the juncture of resistor 207 and capacitor 253. Output terminal 231 is connected to the junction of resistor 229 and capacitor 265.

Zener diodes 213 and 221 are again chosen to have different Zener breakdown voltages, diode 221 having the lower breakdown voltage.

Synchronizing pulses may be coupled to base electrodes 243 and 271 by synchronizing pulse input terminals 255 and 257 respectively. Assume now that the circuit has been energized so that Zener diode 221 is passing Zener current and transistor 239 has been driven to collector current saturation. Current will begin flowing through resistor 205 and resistor 229 to charge capacitor 265 until the voltage across the capacitor exceeds the Zener breakdown voltage of diode 259. A sharp inrush of base current will thereupon flow into transistor 270 to initiate the flow of collector current therethrough. The voltage at terminal 228 will drop and this drop in voltage will be transmitted to base 243 through capacitor 237. The voltage between emitter 245 and collector 241 (i. e., the voltage at terminal 208) will rise due to decreased collector current flow through the transistor. This rise in voltage will be transmitted to base electrode 271 by capacitor 235, augmenting the Zener current through diode 259 to further increase the collector current of transistor 270. The cycle will regenerate until transistor 270 is at collector current saturation and transistor 239 is at cutoff.

Figure 3:
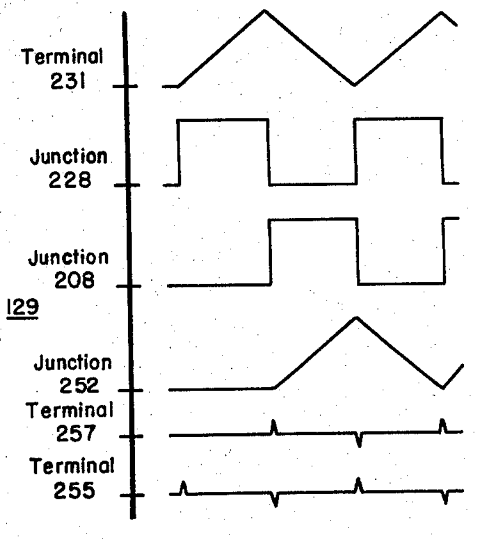
Fig. 3 illustrates wave forms taken at various points in the embodiment of the invention pictured in Fig. 2, which wave-form representations are useful in understanding the operation of the invention.

The above described cycle of operation is pictured by the wave-form representation of Fig. 3, the voltages to the various terminals and junctions as described above being identified to the left of the wave forms. It will be noted that by applying short pulses to terminals 255 and 257 the repetition frequency of the circuit can be locked into step with the frequency of the pulse source.

That the objects set forth above have been achieved is readily apparent. An inspection of the circuitry will reveal that only one bias source having only one pair of output terminals is necessary and that the circuit components are very few in number and are of a type that are necessarily of very small size. It has been found that the circuitry of Fig. 1 can be compressed into a volume of 0.1 cubic inch and that the circuitry of Fig. 2 can be compressed into a volume of 2 cubic inches.

The following table sets forth values which have been found to be perfectly satisfactory in the operation of the circuit of Fig. 2. These values are intended to be exemplary only and are not to be interpreted in a limiting sense.

| | |
|---|---|
| Resistors 201 and 205 | 100K. |
| Resistors 207 and 229 | 1 meg. |
| Resistors 209 and 227 | 220K. |
| Capacitors 253 and 265 | .15–.1. |
| Transistors 239 and 270 | Texas Inst. 904. |
| Capacitors 235 and 237 | 220$\mu\mu$f. |
| Zener diode 213 | 1N202. |
| Zener diode 221 | 1N200. |
| Zener diodes 247 and 259 | 1N205. |
| Bias source | 45 volts. |

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. An electrical triggered circuit, comprising: first transistor means including first collector, first emitter and first base electrode means; second transistor means including second emitter, second base and second collector electrode means; emitter-collector bias supply means for said transistor means; first and second resistor means respectively coupling said first and second transistor means to said bias means; first Zener diode means and third resistor means serially connected between said first collector means and said second base means; second Zener diode means and fourth resistor means serially connected between said second collector means and said first base means; said first and second Zener diode means being polarized so that said bias source forces current therethrough in the reverse-current direction thereof to bring about alternate Zener breakdown therein only when said first and second transistor means respectively are not conducting; the Zener breakdown voltage of said diodes being different in magnitude and less in magnitude than the magnitude of the output voltage of said bias source; and pulse source means coupled to each said respective base electrode means for applying voltage pulses thereto of a polarity to cut off flow of current through each said associated transistor means.

2. An electrically triggered circuit for triggering by control pulses, including: first and second electric valve means each including first and second electrodes and a control electrode for controlling current conduction between said first and second electrodes, a bias source coupled between said first and second electrodes of said valve means by first and second output impedance means, respectively, first means coupling the voltage between said first and second electrodes of said first valve means between said first and control electrodes of said second valve means when said voltage exceeds a first predetermined magnitude operative to bias said second valve means to conduction, second means coupling the voltage between said first and second electrodes of said second valve means between said first and control electrodes of said first valve means when the magnitude thereof exceeds a second predetermined value to bias said first valve means to conduction; first and second voltage integrating means coupled between said first and second electrodes of said first and second valve means respectively; third means coupling the output voltage of said first voltage integrating means to said control electrode of said first valve means operative to bias said first valve means to full current conduction when said output voltage exceeds a predetermined magnitude, and thereby reduce the voltage between said first and second electrodes of said first valve means to a magnitude less than said predetermined magnitude; fourth means coupling the output voltage of said second voltage integrating means to said control electrode of said second valve means operative to bias said second valve means to full current conduction when said output voltage exceeds a preselected magnitude, and thereby reduce the voltage between said first and second electrodes of said second valve means to a magnitude less than said preselected magnitude.

3. An electrically triggered circuit for triggering by control pulses, including: first and second electric valve means each including first and second electrodes and a control electrode for controlling current conduction between said first and second electrodes, a bias source coupled between said first and second electrodes, of said valve means by first and second output impedance means, respectively, first means coupling the voltage between said first and second electrodes of said first valve means between said first and control electrodes of said second valve means when said voltage exceeds a first predetermined magnitude operative to bias said second valve means to conduction, second means coupling the voltage between said first and second electrodes of said second valve means between said first and control electrodes of said first valve means when the magnitude thereof exceeds a second predetermined value to bias said first valve means to conduction; first and second voltage integrating means each including serially connected resistor means and capacitor means coupled between said first and second electrodes of said first and second valve means respectively; third means coupling the output voltage of said first voltage integrating means to said control electrode of said first valve means operative to bias said first valve means to full current conduction when said output voltage exceeds a predetermined magnitude, and therey reduce the voltage between said first and second electrodes of said first valve means to a magnitude less than said predetermined magnitude; fourth means coupling the output voltage of said second voltage integrating means taken across the capacitor thereof to said control electrode of said second valve means operative to bias said second valve means to full current conduction when said output voltage exceeds a preselected magnitude, and thereby reduce the voltage between said first and second electrodes of said second valve means to a magnitude less than said preselected magnitude.

4. Apparatus for producing electrical pulses, comprising: first and second electric valve means, each including first and second terminal electrodes and control electrode means for controlling current flow between said terminal electrodes; a potential source; first and second impedance means for coupling said potential source to said terminal electrodes of said first and second valve means respectively; said control electrode of said second valve means and first Zener diode means coupled by third impedance means between the juncture of said first impedance means and said first valve means; said control electrode of said first valve means and second Zener diode means coupled by fourth impedance means between the juncture of said second impedance means and said second valve means; said first and second Zener diode means being polarized so that said potential source forces current therethrough in the direction to bring about alternate Zener breakdown therein; the Zener breakdown voltage of said first diode being different in magnitude from that of said second diode; said first and second Zener diodes breaking down only when said first and second valve means, respectively, are not conducting; and control voltage means coupled to said control electrodes for applying pulses thereto of a polarity to cut off flow of current through said valve means.

5. Apparatus for producing electrical pulses comprising first transistor means having first emitter, first base, and first collector electrode means; second transistor means having second emitter, second base, and second collector electrode means; first means including first Zener diode means having a first Zener breakdown voltage coupling said first base electrode to said second collector electrode; second means including second Zener diode means having a second Zener breakdown voltage coupling said second base electrode to said first collector electrode; said second and first Zener diodes breaking down and allowing reverse current flow therein only when said first and second transistor means, respectively, are not conducting; first and second impedance means for respectively coupling said first and second collector electrodes to a bias source for supplying emitter-collector bias to said first and second transistor means; first timing circuit means including serially-connected first capacitor means and first resistor means coupled between said first emitter and first collector electrodes; second timing circuit means including serially-connected second capacitor means and second resistor means coupled between said second emitter and second collector electrodes; third Zener diode means coupling said first capacitor between said first emitter and said first base electrodes when the voltage across said first capacitor is greater than the Zener breakdown voltage of said third Zener diode; fourth Zener diode means coupling said second capacitor between said second emitter and said second base electrodes when the voltage across said second capacitor is greater than the Zener breakdown voltage of said fourth Zener diode; and third and fourth capacitor means respectively coupled across said first means and said second means.

6. An electrical multivibrator comprising: first and second electric valve means respectively having first and second control electrodes for controlling current flow therethrough; first and second impedance means respectively coupling to a voltage source across said first and second electric valve means, first Zener diode means for coupling said first control electrode to said second impedance means when the voltage across said second valve exceeds a first predetermined magnitude; second Zener diode means for coupling said second control electrode to said first impedance means when the voltage across said first valve means exceeds a second predetermined magnitude less than said first predetermined magnitude; said first and second Zener diodes breaking down and allowing reverse current flow therein only when said second and first valve means, respectively, are not conducting; and control voltage means coupled to said control electrodes for alternately biasing said first and second valve means to cutoff.

References Cited in the file of this patent

UNITED STATES PATENTS

| | | |
|---|---|---|
| 2,569,345 | Shea | Sept. 25, 1951 |
| 2,644,894 | Lo et al. | July 7, 1953 |
| 2,759,104 | Skellett | Aug. 14, 1956 |
| 2,778,978 | Drew | Jan. 22, 1957 |
| 2,787,712 | Priebe et al. | Apr. 2, 1957 |

OTHER REFERENCES

Sulzer: "Junction Transistor Circuit Applications," Electronics, pp. 170–173, August 1953.

Linvill: "Nonsaturating Pulse Circuits Using Two Junction Transistors," Proc. IRE, July 1955, pp. 826–833.